US006257535B1

(12) United States Patent
Jaing

(10) Patent No.: US 6,257,535 B1
(45) Date of Patent: Jul. 10, 2001

(54) ADJUSTABLE MICROPHONE MOUNTING ASSEMBLY

(75) Inventor: Panding Jaing, Taipei (TW)

(73) Assignee: Yoga Electronic Co., Ltd., Taipei (TW)

( * ) Notice: Subject to any disclaimer, the term of this patent is extended or adjusted under 35 U.S.C. 154(b) by 0 days.

(21) Appl. No.: 09/224,888

(22) Filed: Dec. 31, 1998

(51) Int. Cl.[7] .......... F16B 47/00
(52) U.S. Cl. .......... 248/205.5
(58) Field of Search .......... 248/205.5, 206.2, 248/309.3, 363, 307, 305, 301, 198.1, 295.11, 205.8, 206.1, 206.3, 206.4, 362

(56) References Cited

U.S. PATENT DOCUMENTS

D. 357,557 * 4/1995 Piper .......... 248/206.2
2,157,001 * 5/1939 Morley .......... 248/205.5
2,296,073 * 9/1942 Walgo .......... 248/205.5
2,590,006 * 3/1952 Gordon .......... 248/205.5
2,783,367 * 2/1957 Locke .......... 248/205.5
3,176,602 * 4/1965 Wilt .......... 248/205.5
3,924,787 * 5/1939 Gothrup .......... 248/206.2
4,456,210 * 6/1984 McBride .......... 248/205.5
4,913,390 * 4/1990 Berke .......... 248/176
5,390,837 * 2/1995 Ruffolo, Jr. .......... 248/206.2

* cited by examiner

*Primary Examiner*—Ramon O. Ramirez
*Assistant Examiner*—Kimberly Wood
(74) *Attorney, Agent, or Firm*—Donald C. Casey, Esq

(57) ABSTRACT

An adjustable microphone mounting assembly includes a hook plate for hooking on the pocket, the belt, etc., a vacuum mount fixedly secured to the hook plate at one end for securing the hook plate to a flat surface by a vacuum suction force, an adjustment plate slidably supported on the hook plate and locked by a lock screw, and a clamp fixedly fastened to the adjustment plate at one end to hold a microphone.

7 Claims, 3 Drawing Sheets

ADJUSTABLE MICROPHONE MOUNTING ASSEMBLY

BACKGROUND OF THE INVENTION

The present invention relates to a microphone mounting assembly for securing a microphone to an object, and more particularly to an adjustable microphone mounting assembly which can secure a microphone to any of a variety of objects at any of a variety of angles.

A variety of mini microphones have been disclosed, and intensively used by individuals in different places and situations. When a microphone is used, fastening means or support means is necessary to secure or support the microphone in place. However, conventional fastening and support means have a limitation in use. These fastening and support means cannot fit all requirements in holding a microphone to any of a variety of objects at any of a series of angles.

SUMMARY OF THE INVENTION

The present invention has been accomplished to provide an adjustable microphone mounting assembly that can be secured to any of a variety of objects to hold the microphone at any of a series of angles. According to one embodiment of the present invention, the adjustable microphone mounting assembly comprises a hook plate for hooking on the pocket, the belt, etc., a vacuum mount fixedly secured to the hook plate at one end for securing the hook plate to a flat surface by a vacuum suction force, an adjustment plate slidably supported on the hook plate and locked by a lock screw, and a clamp fixedly fastened to the adjustment plate at one end to hold a microphone between two reversed directions. According to another embodiment of the present invention, the clamp is eliminated, and the microphone is directly coupled to the adjustment plate by a swivel joint.

DETAILED DESCRIPTION OF THE PREFERRED EMBODIMENT

Figure 1A:
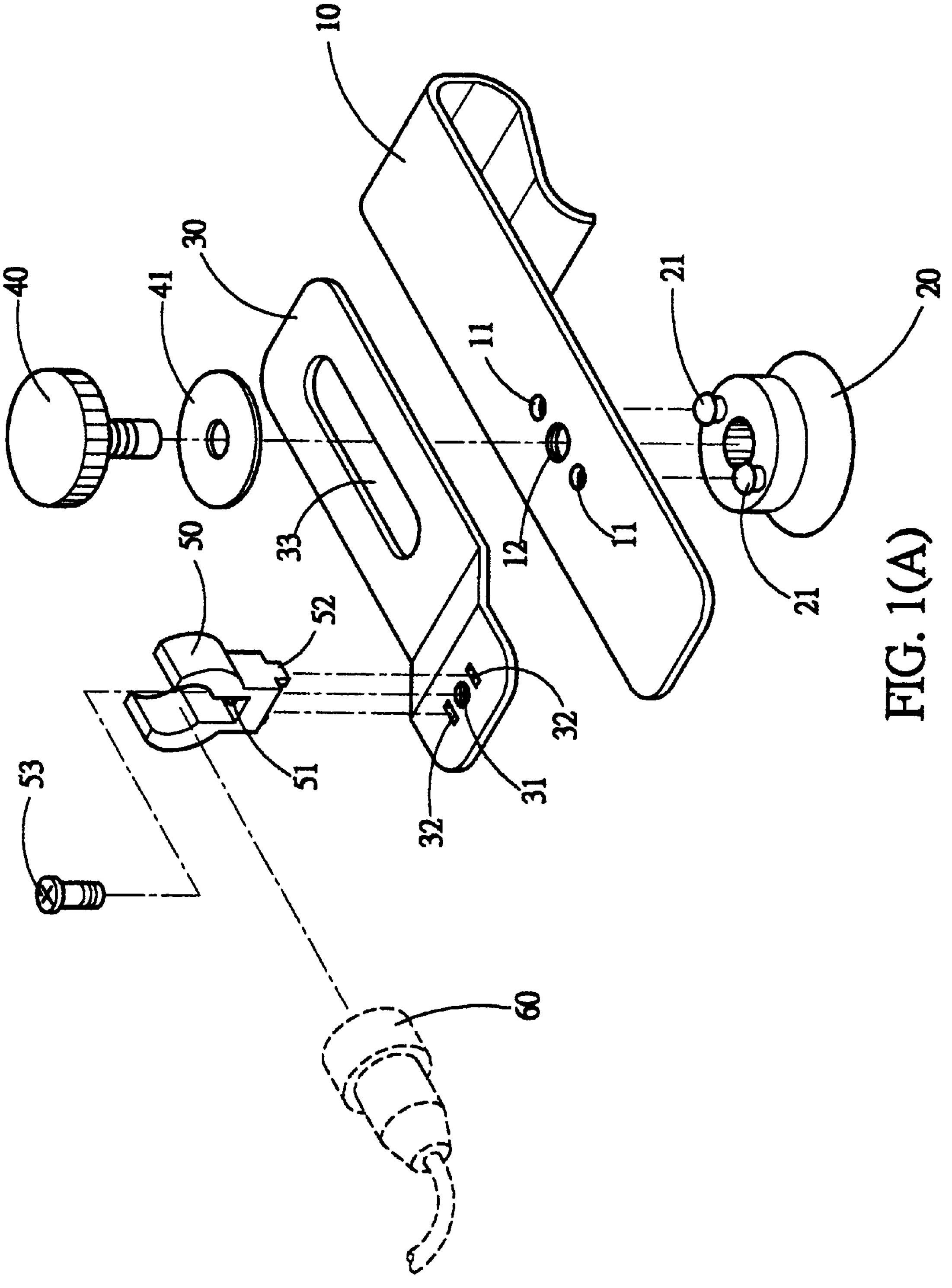
FIG. 1A is an exploded view of an adjustable microphone mounting assembly according to one embodiment of the present invention.

Referring to FIG. 1A, a microphone mounting assembly in accordance with the present invention comprises:

a hook plate 10, the hook plate 10 having a flat, elongated base, a hooked portion at one end of the flat, elongated base, a screw hole 12 at the flat, elongated base at a suitable location, and two coupling holes 11 equally spaced from the screw hole 12 at two opposite sides;

a vacuum mount 20, the vacuum mount 20 being a flexible, disk-like member having two coupling rods 21 raised from the top side wall thereof for coupling to the coupling holes 11 at the hook plate 10;

an adjustment plate 30 slidably supported on the hook plate 10, the adjustment plate 30 having a longitudinally extended, elongated sliding slot 33 of width greater than the diameter of the screw hole 12 at the hook plate 10, a screw hole 31 near its one end, and two coupling holes 32 equally spaced from the screw hole 31 at two opposite sides;

a lock screw 40 for threading into the screw hole 12 at the hook plate 10 to lock the adjustment plate 30;

a washer 41 mounted on the lock screw 40 above the adjustment plate 30;

a clamp 50 for holding a microphone 60, the clamp 50 having a mounting hole 51 for connection to the screw hole 31 at the adjustment plate 30 by a tie screw 53, and two downward coupling rods 52 raised from the bottom side wall thereof for coupling to the coupling holes 32 at the adjustment plate 30.

Figure 1B:
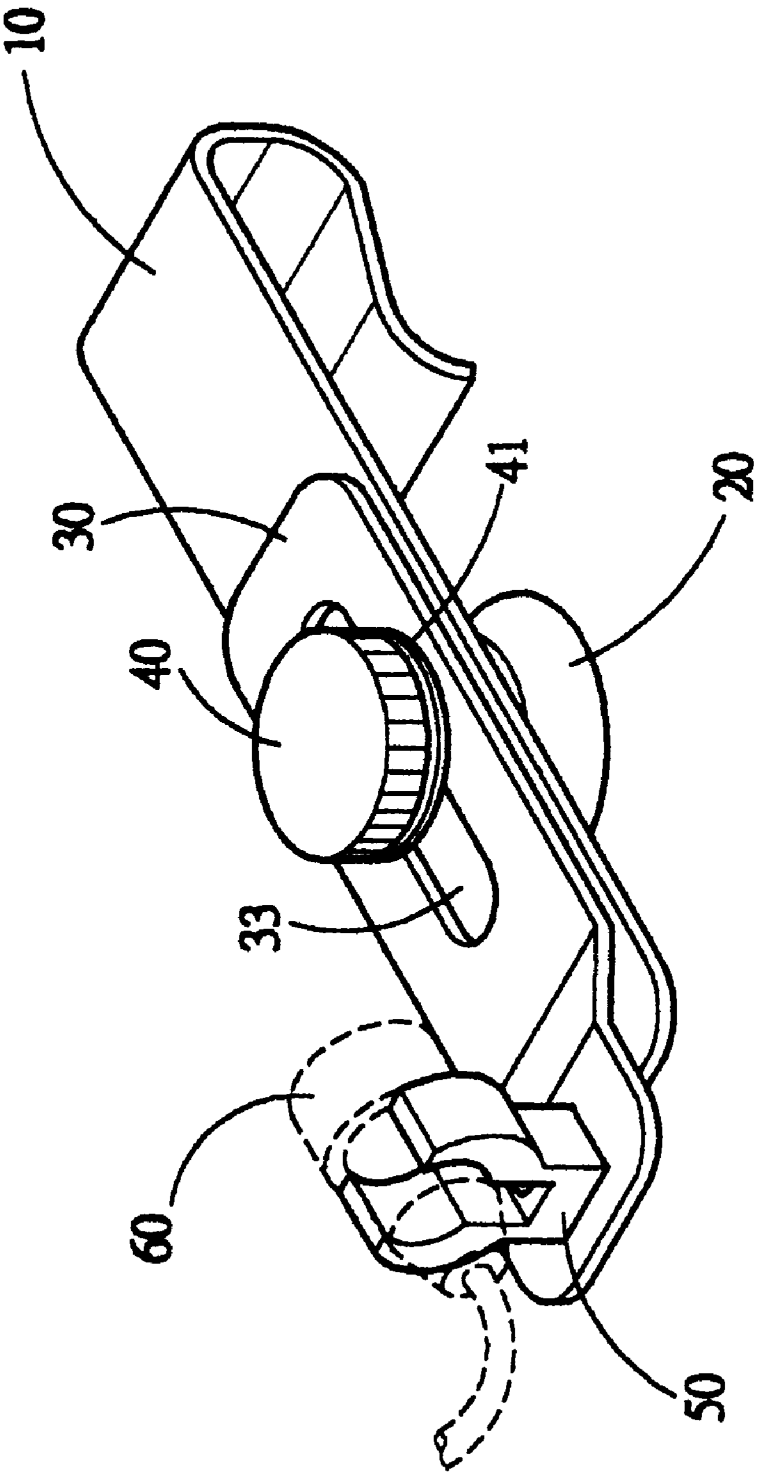
FIG. 1B is an assembly view of the adjustable microphone mounting assembly shown in FIG. 1A.
Figure 3:
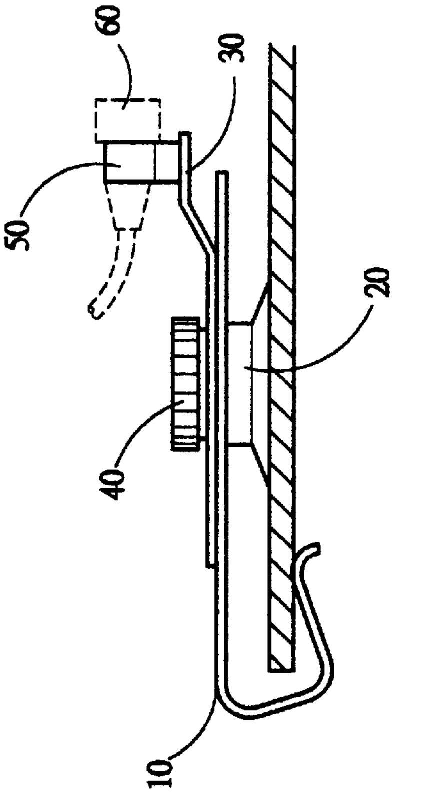
FIG. 3 shows an application example of the present invention.

Referring to FIG. 1B and FIG. 1A again, the adjustable microphone mounting assembly is assembled by: coupling the coupling rods 21 of the vacuum mount 20 to the coupling the holes 11 at the hook plate 10 respectively, then attaching the adjustment plate 30 to the hook plate 10, and then inserting the lock screw 40 through the elongated sliding slot 33 at the adjustment plate 30 and threading the lock screw 40 into the screw hole 12 at the hook plate 10 to lock the adjustment plate 30 in place, and then coupling the coupling rods 52 of the clamp 50 to the coupling holes 32 at the adjustment plate 30, and then threading the screw 33 through the mounting hole 51 at the clamp 50 into the screw hole 31 at the adjustment plate 30 to fixedly secure to the clamp 50 to the adjustment plate 30, and then securing the microphone 60 to the clamp 50.

Referring to Figures from 2 through 4, when the lock screw 40 is loosened, the adjustment plate 30 can be moved in direction A relative to the hook plate 10 to the desired position. When adjusted, the lock screw 40 is fastened tight again. The microphone 60 can also be secured to the clamp 50 in reversed direction. Further, two clamps 50 may be provided at one end of the adjustment plate 30 for holding two microphones 60. By means of the hooked portion of the hook plate 10, the adjustable microphone mounting assembly can be fastened to the pocket, the belt, or a peripheral edge of an object. By means of the vacuum mount 20 and the hook plate 10, the adjustable microphone mounting assembly can be installed in a flat wall near the border area, for example, the border area of the top of a table or desk, the peripheral edge of a motor vehicle sunshade or the sound hole of a guitar, etc. The adjustable microphone mounting assembly can be installed in horizontal, vertical, or any desired direction.

Figure 4:
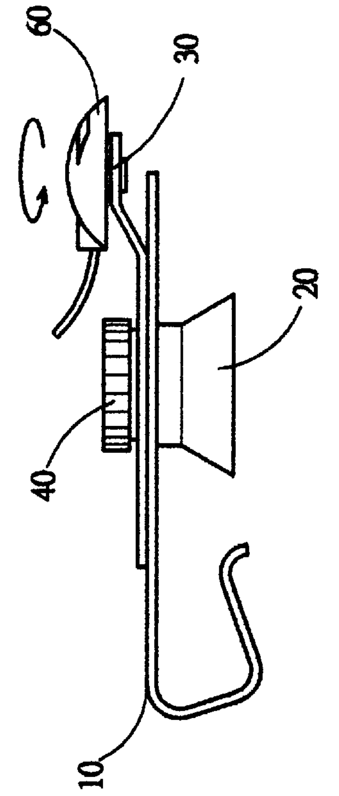
FIG. 4 shows an alternate form of the present invention.
Figure 2:
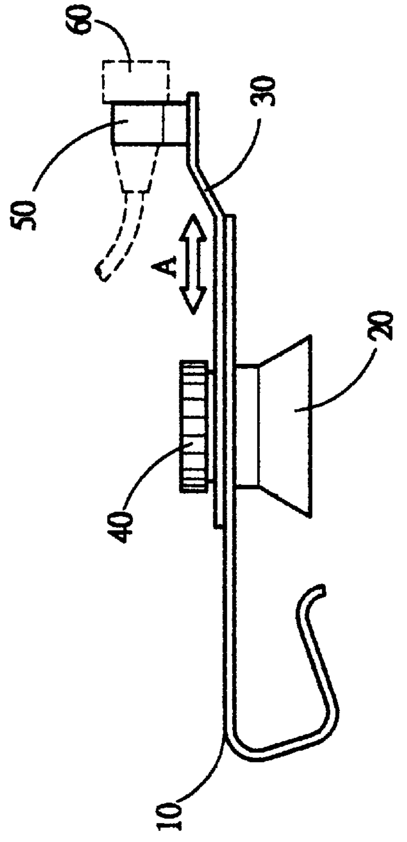
FIG. 2 shows the position of the adjustment plate adjusted according present invention.

FIG. 4 shown an alternate form of the present invention. This embodiment eliminates the aforesaid clamp 50, and the microphone 60 is directly mounted on the adjustment plate 10 by a swivel joint.

It is to be understood that the drawings are designed for purposes of illustration only, and are not intended as a definition of the limits and scope of the invention disclosed.

What the invention claimed is:

1. An adjustable microphone mounting assembly comprising:

a hook plate, said hook plate having a flat, elongated base, a hooked portion at one end of the flat, elongated base, and a screw hole at said flat, elongated base remote from said hooked portion;

a vacuum mount fixedly secured to said elongated base of said hook plate for securing said hook plate to a flat surface;

an adjustment plate slidably supported on the elongated base of said hook plate, said adjustment plate having a longitudinally extended, elongated sliding slot of width greater than the diameter of the screw hole at said hook plate;

a lock screw inserted through the sliding slot on the adjustment plate and threaded into the screw hole at said hook plate to lock said adjustment plate; and a clamp fixedly fastened to said adjustment plate at one end for holding a microphone.

2. An adjustable microphone mounting assembly comprising:

a hook plate, said hook plate having a flat, elongated base, a hooked portion at one end of the flat, elongated base, and a screw hole at said flat, elongated base remote from said hooked portion;

a vacuum mount fixedly secured to said elongated base of said hook plate for securing said hook plate to a flat surface;

an adjustment plate slidably supported on the elongated base of said hook plate, said adjustment plate having a longitudinally extended, elongated sliding slot of width greater than the diameter of the screw hole at said hook plate;

a lock screw inserted through the sliding slot on the adjustment plate and threaded into the screw hole at said hook plate to lock said adjustment plate; and a microphone mounted on said adjustment plate at one end.

3. The adjustable microphone mounting assembly of claim 1 wherein said hook plate comprises two coupling holes at its elongated base, and said vacuum mount comprises two coupling rods raised from a top side wall thereof and respectively coupled to the coupling holes at said hook plate.

4. The adjustable microphone mounting assembly of claim 2 wherein said hook plate comprises two coupling holes at its elongated base, and said vacuum mount comprises two coupling rods raised from a top side wall thereof and respectively coupled to the coupling holes at said hook plate.

5. The adjustable microphone mounting assembly of claim 1 wherein said adjustment plate comprises a screw hole at one end and two coupling holes equally spaced from the screw hole at two opposite sides, and said clamp comprises two downward coupling holes respectively coupled to the coupling holes at said adjustment plate an a mounting hole fixedly fastened to the screw hole at said adjustment plate by a tie screw.

6. The adjustable microphone mounting assembly of claim 1 further comprising a second clamp fixedly fastened to said adjustment plate for holding a second microphone.

7. The adjustable microphone mounting assembly of claim 2 wherein said microphone is fastened to said adjustment plate by a swivel joint.

* * * * *